United States Patent
Birkett et al.

(10) Patent No.: US 7,567,631 B2
(45) Date of Patent: Jul. 28, 2009

(54) METHOD FOR AMPLITUDE INSENSITIVE PACKET DETECTION

(76) Inventors: Neil Birkett, 16 Dallaire Crescent, Richmond, Ontario (CA) K0A 2Z0; Trevor Yensen, 3744 Twin Falls Place, Ottawa, Ontario (CA) K1V 1W7; Phil Guillemette, 2002 - 190 Lees Avenue, Ottawa, Ontario (CA) K1S 5L5

( * ) Notice: Subject to any disclaimer, the term of this patent is extended or adjusted under 35 U.S.C. 154(b) by 874 days.

(21) Appl. No.: 10/661,943

(22) Filed: Sep. 12, 2003

(65) Prior Publication Data

US 2005/0058227 A1   Mar. 17, 2005

(51) Int. Cl.
H03D 3/22   (2006.01)
(52) U.S. Cl. .................................................. 375/331
(58) Field of Classification Search ............... 375/343, 375/279, 316, 317, 319–333, 336, 340, 269, 375/261
See application file for complete search history.

(56) References Cited

U.S. PATENT DOCUMENTS

| | | | | |
|---|---|---|---|---|
| 5,276,706 | A * | 1/1994 | Critchlow | 375/343 |
| 5,468,115 | A * | 11/1995 | Alvis | 414/556 |
| 5,536,902 | A * | 7/1996 | Serra et al. | 84/623 |
| 6,130,577 | A | 10/2000 | Tamba et al. | |
| 6,141,372 | A * | 10/2000 | Chalmers | 375/147 |
| 6,466,832 | B1 * | 10/2002 | Zuqert et al. | 700/94 |
| 6,526,107 | B1 * | 2/2003 | Katoh et al. | 375/368 |
| 6,683,921 | B1 * | 1/2004 | Shiraishi et al. | 375/331 |
| 6,704,353 | B1 * | 3/2004 | McCarty et al. | 375/227 |
| 6,784,740 | B1 * | 8/2004 | Tabatabaei | 330/279 |
| 7,477,694 | B2 * | 1/2009 | Sanderford et al. | 375/261 |
| 2001/0028673 | A1 * | 10/2001 | Gunzelmann et al. | 375/130 |
| 2001/0055320 | A1 * | 12/2001 | Pierzga et al. | 370/480 |
| 2002/0083474 | A1 * | 6/2002 | Hennenhoefer et al. | 725/143 |

(Continued)

FOREIGN PATENT DOCUMENTS

EP   1424801   6/2004

(Continued)

OTHER PUBLICATIONS

PCT Office—Canada Branch, International Search Report, Jan. 21, 2005, 2 pgs.

(Continued)

*Primary Examiner*—Tesfaldet Bocure
*Assistant Examiner*—Vineeta S Panwalkar
(74) *Attorney, Agent, or Firm*—Stolowitz Ford Cowger LLP (57) ABSTRACT

The invention relates generally to the field of wireless communications and more particularly to a method of and device for detecting the presence of a received data packet in a digital receiver. The present invention proposes a simplified method of correlation by removing dependency on the amplitude fluctuations while at the same time maintaining phase relevancy. The key advancement involves mapping the complex quadrature amplitude modulation (QAM) preamble to a quantized phase shift keying (PSK) constellation before application to a matched complex correlator. The proposed process essentially "amplitude normalizes" the input signal without the use or complexity associated with a divider. This simplified normalization scheme makes the packet detection algorithm robust against amplitude variations in the input signal, while still allowing for good correlation output. In applications where interference is superimposed on the I/Q input signals, the invention improves the detection capability over automatic gain control (AGC) normalization methods.

18 Claims, 7 Drawing Sheets

U.S. PATENT DOCUMENTS

2002/0168034 A1* 11/2002 Yang et al. .................. 375/342
2003/0103581 A1   6/2003 Rawlins et al.
2003/0161428 A1   8/2003 Garrett

FOREIGN PATENT DOCUMENTS

WO         03017608        2/2003

OTHER PUBLICATIONS

Razavi, Behzad, "RF Microelectronics", Jan. 1, 1998, Prentice Hall Ptr., Upper Saddle River, NJ, USA, XP002501752, pp. 131-133.

European Patent Office, European Search Report, Nov. 7, 2008, 3 pgs.

* cited by examiner

METHOD FOR AMPLITUDE INSENSITIVE PACKET DETECTION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The invention relates generally to the field of wireless communications and more particularly to a method of and device for detecting the presence of a received data packet in a digital receiver.

2. Description of the Related Prior Art

Rapid growth in the portable communications market has pushed designers to seek low-cost, low-power, highly integrated solutions for the radio frequency (RF) transceiver in accordance with the IEEE 802.11a-1999 Part 11: "Wireless LAN Medium Access Control (MAC) and Physical Layer (PHY) Specifications—High Speed Physical Layer in the 5 GHz Band which is incorporated herein by reference. As those skilled in the art will appreciate, an important aspect of any wireless receiver is the ability to detect the presence of data packets where the received signal may be degraded as a result of multi-path fading and/or the presence of noise.

A wireless radio receiver employing digital demodulation methods typically detects the presence of energy in order to start a timing machine to control the proper acquisition of the radio signal. This acquisition typically involves determining a radio frequency preamble or known 'signature' signal.

Acquisition involves applying the input signal to a filter "matched" to the original RF signature and examining the matched filter output for a "peak" to signify that a signal with a valid signature was detected. As will be appreciated by those in the art, certain radio frequency applications perform signal processing operations by separating radio frequency signals into signal components representing in-phase (I) and quadrature (Q) channels (I/Q channels). If the RF signal is demodulated to complex I/Q baseband then the matched filter must also be complex I/Q at baseband. This process is defined as "complex matched filter correlation" or "correlation" for short.

If the radio signal undergoes rapid automatic gain control (AGC) fluctuation during the acquisition process, then the quality of the correlation peak will deteriorate and the determination of a valid signature may be compromised. As those in the art will appreciate, an AGC circuit is a circuit by which gain is automatically adjusted in a specific manner as a function of a specified parameter, such as received signal strength (RSSI).

Past solutions normalize the baseband I or Q signals by dividing by an estimate of the AGC gain in a receiver line-up. The problem with this approach is that it requires an estimate of the gain value. This gain estimate takes time, and is usually noisy if limited time is available, so in applications where limited time is available (as in IEEE 802.11a) a poor estimate must be used, resulting in a noisy correlator output and an increased probability of false detection.

The poor gain estimate means that a conventional normalization will create a correlator output that is either too large or too small depending on the difference between the magnitude of the input signal and the value of the gain estimate.

SUMMARY OF THE INVENTION

In order to overcome the deficiencies of the prior art there is provided a simplified method of correlation which eliminates dependency on input signal amplitude fluctuations while at the same time maintaining phase relevancy, which is important for the correlation process. The present invention removes the requirement for full normalization, which is usually done by a complex multiplier circuit and replaces it with a simple look-up table (LUT) with M discrete complex I/Q phase outputs.

In accordance with one aspect of the invention there is provided in a digital wireless receiver, a method of detecting the presence of a data packet in a received radio frequency (RF) signal comprising the steps of: separating the RF signal into in-phase (I) and quadrature (Q) signals; removing direct current (DC) offsets from the I and Q signals; modulating the I and Q signals; performing amplitude normalization on said modulated I and Q signals; comparing said amplitude normalized I and Q signals to a reference signal via a complex correlator; detecting a peak of said complex correlator output; and if said peak is above a predefined threshold, indicating that a data packet has been received, else performing steps (a) to (g) on a subsequently received RF signal.

Preferably, the step of performing amplitude normalization comprises mapping said modulated I and Q signals to a quantized phase shift keying (PSK) signal constellation.

In accordance with a second aspect of the invention, there is provided in a wireless digital receiver, a circuit for detecting the presence of a data packet in a received radio frequency (RF) signal comprising: a direct current (DC) offset module to correct for local oscillator (LO) leakage in in-phase (I) and quadrature (Q) signals derived from the received RF signal; an acquisition module communicating with the DC offset module comprising: a M-ary phase shift keying (PSK) mapper for mapping the I and Q signals to a quantized PSK signal constellation; a complex correlator receiving input from the M-ary PSK mapper for comparing the mapped I and Q signals to a reference; and a detector receiving input from the complex correlator for determining the presence of a correct signature.

Preferably, the detector further comprises: a complex to polar (C2P) stream converter for converting the output of the complex correlator into an amplitude and phase value; a magnitude calculation module for determining a signal size of the converted output; and a peak detection module communicating with the magnitude calculation module for determining the presence of information bits.

The advantages of the invention are now readily apparent. This simplified normalization scheme makes the algorithm robust against amplitude variations in the input signal, while still allowing for good correlation output. In applications where interference is superimposed on the I/Q input signals, the invention improves the detection capability over AGC normalization methods.

BRIEF DESCRIPTION OF THE DRAWINGS

A better understanding of the invention will be obtained by considering the detailed description below, with reference to the following drawings in which.

DESCRIPTION OF THE PREFERRED EMBODIMENT

Figure 1:
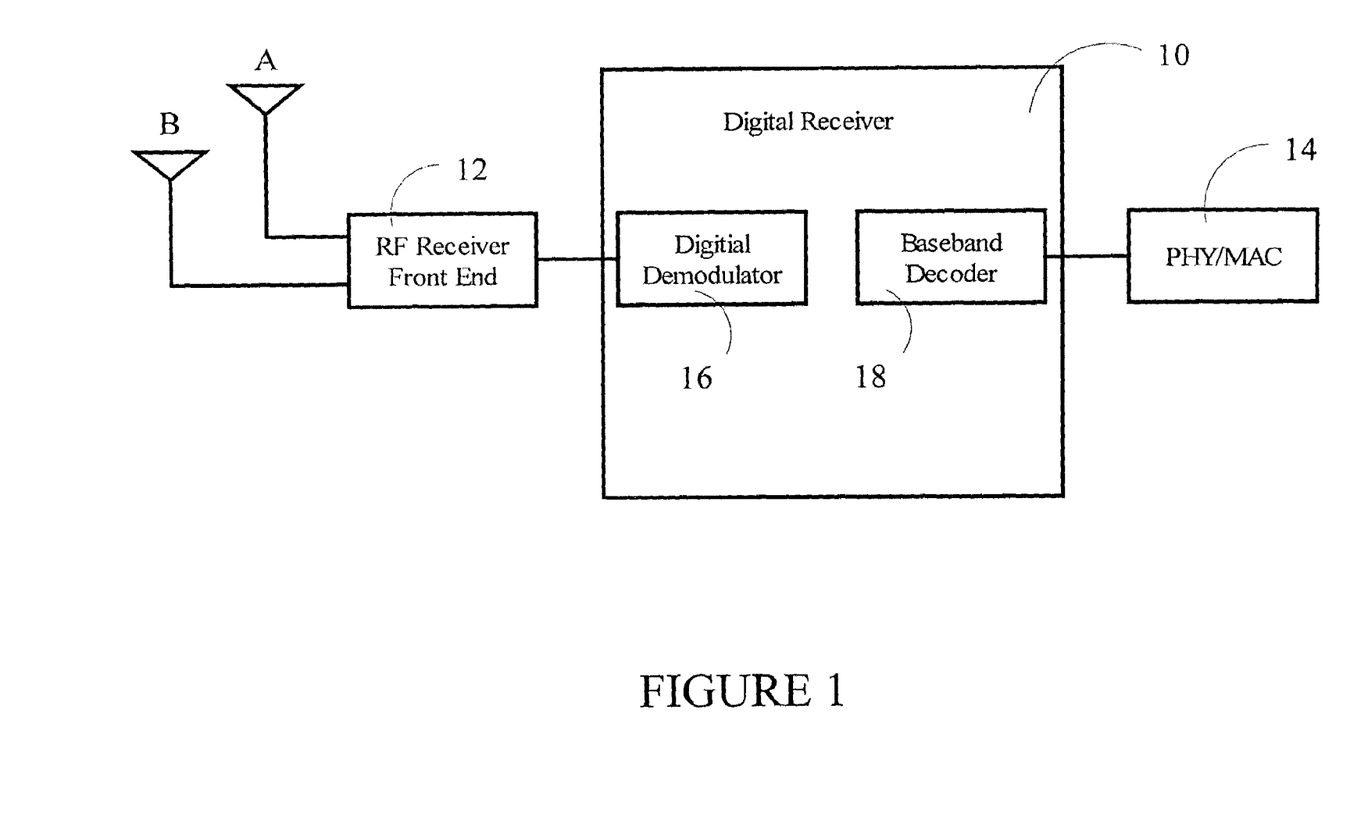
FIG. 1 is a block diagram of a digital receiver.

Referring to FIG. 1, there is depicted a digital receiver 10 in which the present invention is housed. The preferred digital receiver 10 may be, for example, the ICE5350 Digital Receiver offered by IceFyre Semiconductor Inc. which performs all the physical layer functions detailed in the IEEE 802.11a standard, but the invention is not meant to be limited to this receiver. The digital receiver 10 is located between the RF Receiver Front End 12 and the Physical Medium Access Control (PHY/MAC) 14. The RF Receiver Front End 12 connects to antennae A and B. As shown in the drawing, the two main blocks within the digital receiver 10 are the digital demodulator 16 and the baseband decoder 18. The digital demodulator 16 recovers the baseband signal by removing carrier offsets, timing offsets, compensating for the channel impairments and demapping the digitally modulated signal. This block is located between the analog-to-digital interface (not shown) and the baseband interface (not shown). The baseband decoder 18 de-interleaves the baseband signal, provides error correction through the soft-decision Viterbi algorithm and unscrambles the corrected bit stream to be passed through the PHY/MAC 14. This block is located between the baseband interface (not shown) and the PHY/MAC interface (not shown).

Figure 2:
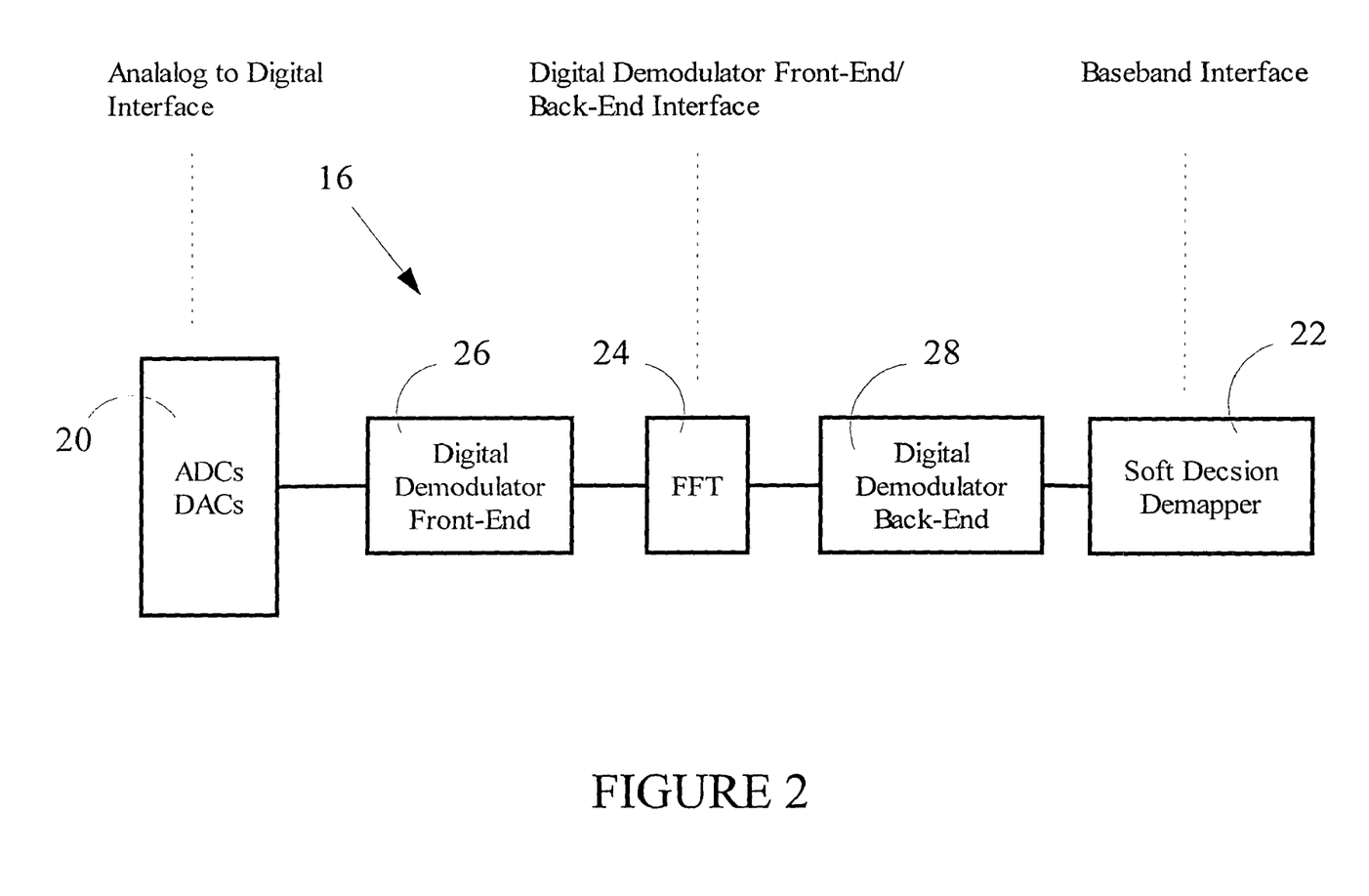
FIG. 2 is a block diagram of digital demodulator contained in the digital receiver of FIG. 1.

FIG. 2 depicts the digital demodulator 16 of FIG. 1. As shown in the diagram, the analog to digital interface is located at block ADCs/DACs 20. The baseband interface can also be seen in the figure at the soft decision demapper 22. It can also be seen in the figure that the digital demodulator 16 is distinctly divided into two parts by the Fast Fourier Transform (FFT) circuit 24. To the left is the digital demodulator front-end (DFE) 26, while to the right is the digital demodulator back-end (DBE) 28. The invention of the present invention is provided in the digital demodulator front-end 26.

Figure 3:
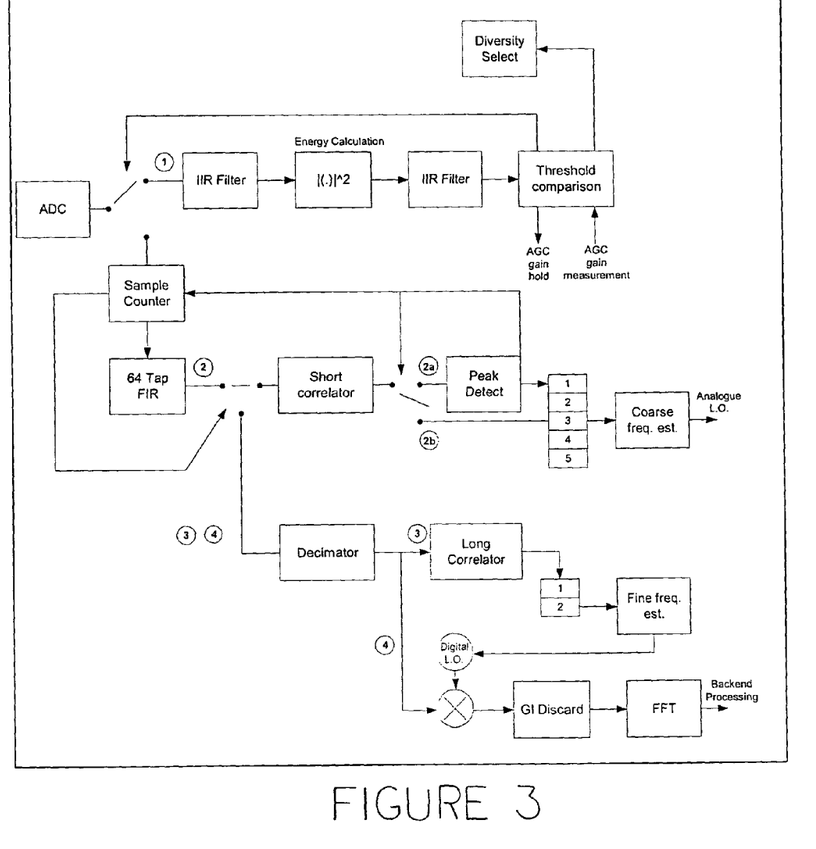
FIG. 3 is a block diagram of the digital demodulator front-end contained in the digital demodulator of FIG. 2.

FIG. 3 provides a more detailed overview of the digital demodulator front-end 26. As depicted in the Figure, there are four main processing paths in the front-end (shown in circled numbers 1 to 4):

1) Signal detection path, the purpose of which is to determine when a burst is present and select the best antenna for use;
2) SHORT symbol correlation path, the purpose of which is to determine burst timing and make a course frequency estimate and pass the estimate to the analog block local oscillator;
3) LONG symbol correlation path, the purpose of which is to make a fine frequency estimate and initialize the digital local oscillator; and
4) Data detection path, the purpose of which is to downsample the orthogonal frequency division multiplexed (OFDM) symbols, correct the center frequency, and remove the Guard Interval (GI).

The present invention pertains to the data detection path.

Figure 4:
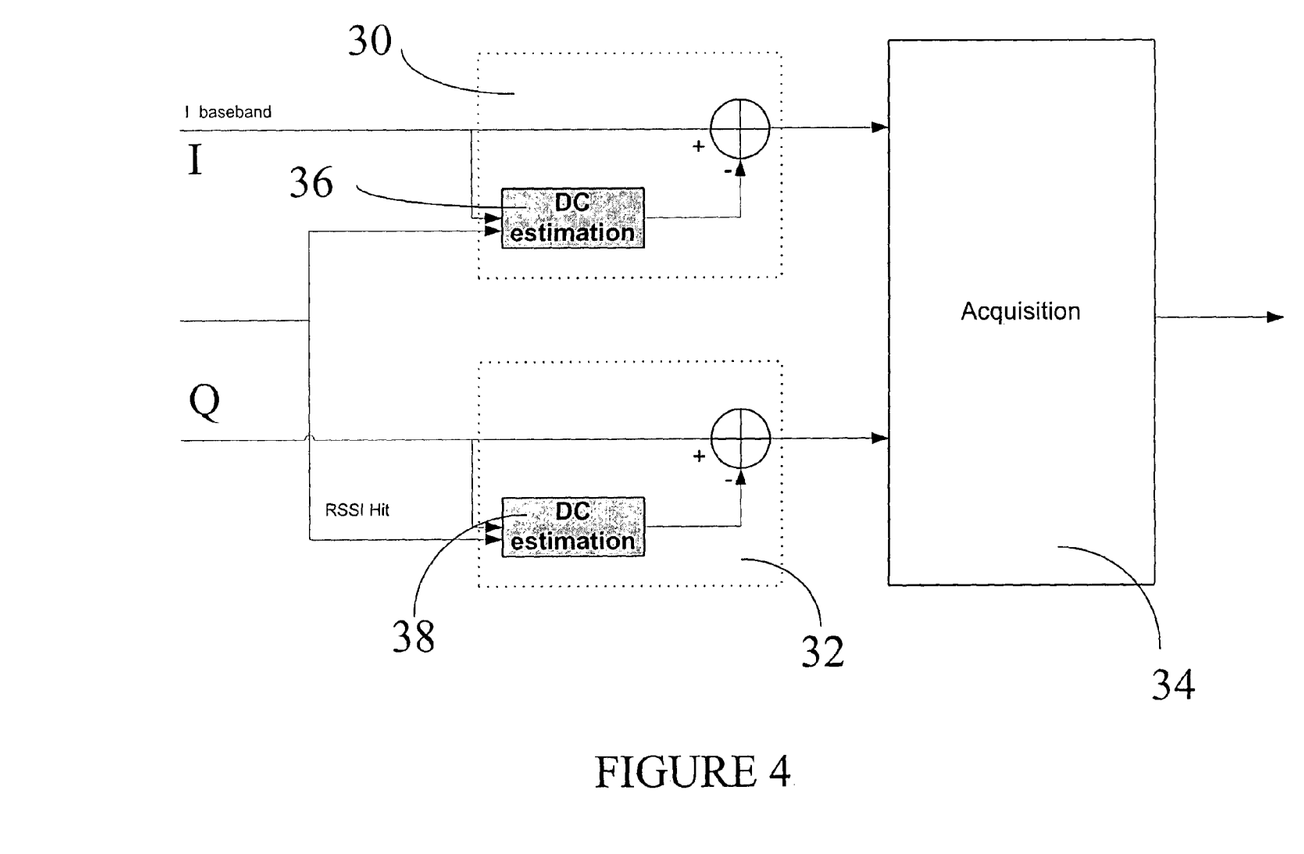
FIG. 4 is a block diagram of the packet detection system of the present invention contained in the digital demodulator front-end of FIG. 3.

FIG. 4 is a block diagram of the packet detection system of the present invention. As indicated above, the present invention proposes a simplified method of correlation by removing dependency on the input RF signal amplitude fluctuations while at the same time maintaining phase relevancy. The key advancement involves mapping the complex quadrature amplitude modulation (QAM) preamble to a quantized phase shift keying (PSK) constellation before application to a matched complex correlator. This process essentially "amplitude normalizes" the input signal without the use or complexity associated with a divider. As will be discussed in greater detail in relation to FIG. 5, the output from the PSK mapper may take any one of M phases on the unit circle, but only has a unity magnitude.

More specifically, as shown in FIG. 4, the system comprises I and Q direct current (DC) offset modules 30, 32 and acquisition block 34. Each of the I and Q signals must have DC offsets removed to some degree since DC offsets may skew the performance of the acquisition block. As those skilled in the art will appreciate, DC offsets arise from local oscillator (LO) leakage or feedthrough. The leakage signal is mixed with the LO signal thereby producing a DC component. If directly amplified, the offset voltage can saturate the circuit, prohibiting the amplification of the desired signal. Therefore some means of offset cancellation is required. DC estimation modules 36, 38 estimate the required offset which is applied to the incoming I and Q signals. As those in the art will understand, one method of offset cancellation involves exploiting the idle time intervals in digital wireless standards to carry out offset cancellations.

Figure 5:
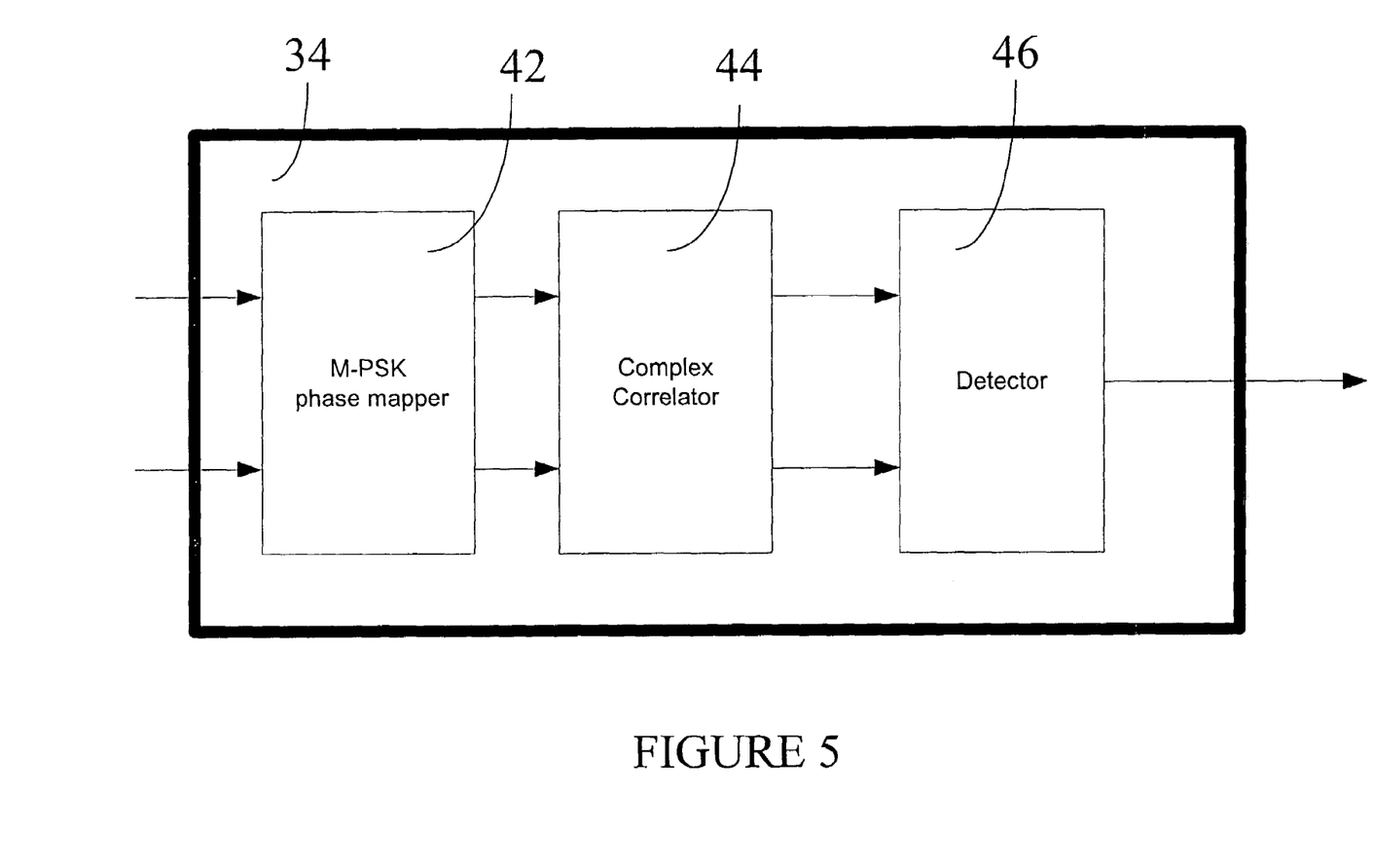
FIG. 5 is a block diagram of the acquisition block of the packet detection system of FIG. 4.

The acquisition module is depicted in FIG. 5 and consists of a M-ary Phase Shift Keying (PSK) phase mapper 40, a complex correlator 42 and a detector 44. In digital RF systems, the carrier is modulated by a digital baseband signal. One such modulation technique known in the art is phase shift keying in which the phase of a carrier is discretely varied in relation either to a reference phase or the phase of the immediately preceding signal element, in accordance with the data being transmitted. The simplest method, binary PSK (BPSK) uses only two signal phases: 0 and 180 degrees. It is sometimes advantageous to employ multilevel digital signals (as opposed to binary signals) to modulate the carrier. This form of signaling is called M-ary signaling, where M is a parameter representing the number of phases chosen. M-ary PSK used in the present invention is a multilevel modulation technique in which multiple phase angles are modulated (e.g. 0, +45, −45, +90, −90, +135, −135, 180).

Figure 6:
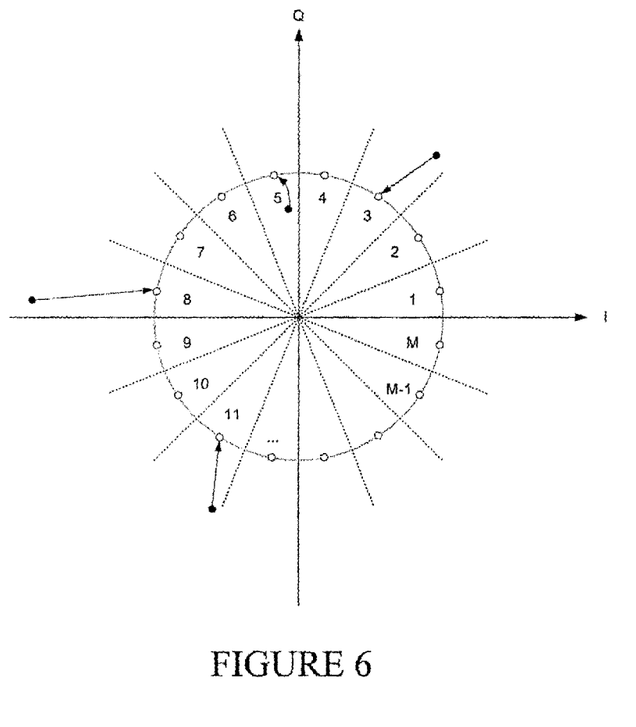
FIG. 6 is an I/Q signal constellation.

As indicated in the background section, after demodulation, the received signal is down-converted to an in-phase (I) and a quadrature (Q) baseband component, representing the amplitude of cosine and sine components respectively. It is very helpful to view these signals on a so-called "constellation" diagram, also known as a polar plot or Argand diagram—a 2-dimensional representation with in-phase (I) on the X axis and quadrature (Q) on the Y axis. At any instant, the signal's two values can be represented by a point on this X/Y plot. In the case of the present invention, M-ary PSK phase mapper 42 maps a particular I/Q constellation point to a defined output I/Q lying on the unit circle as shown in FIG. 6. As seen in FIG. 6, several mappings which serve to quantize the phase angle and limit the amplitude to "1" are depicted. The process essentially "amplitude normalizes" the input signal without the requirement for additional components. Better performance can be obtained by increasing the number of phases M in the M-ary PSK mapper 42.

Figure 7:
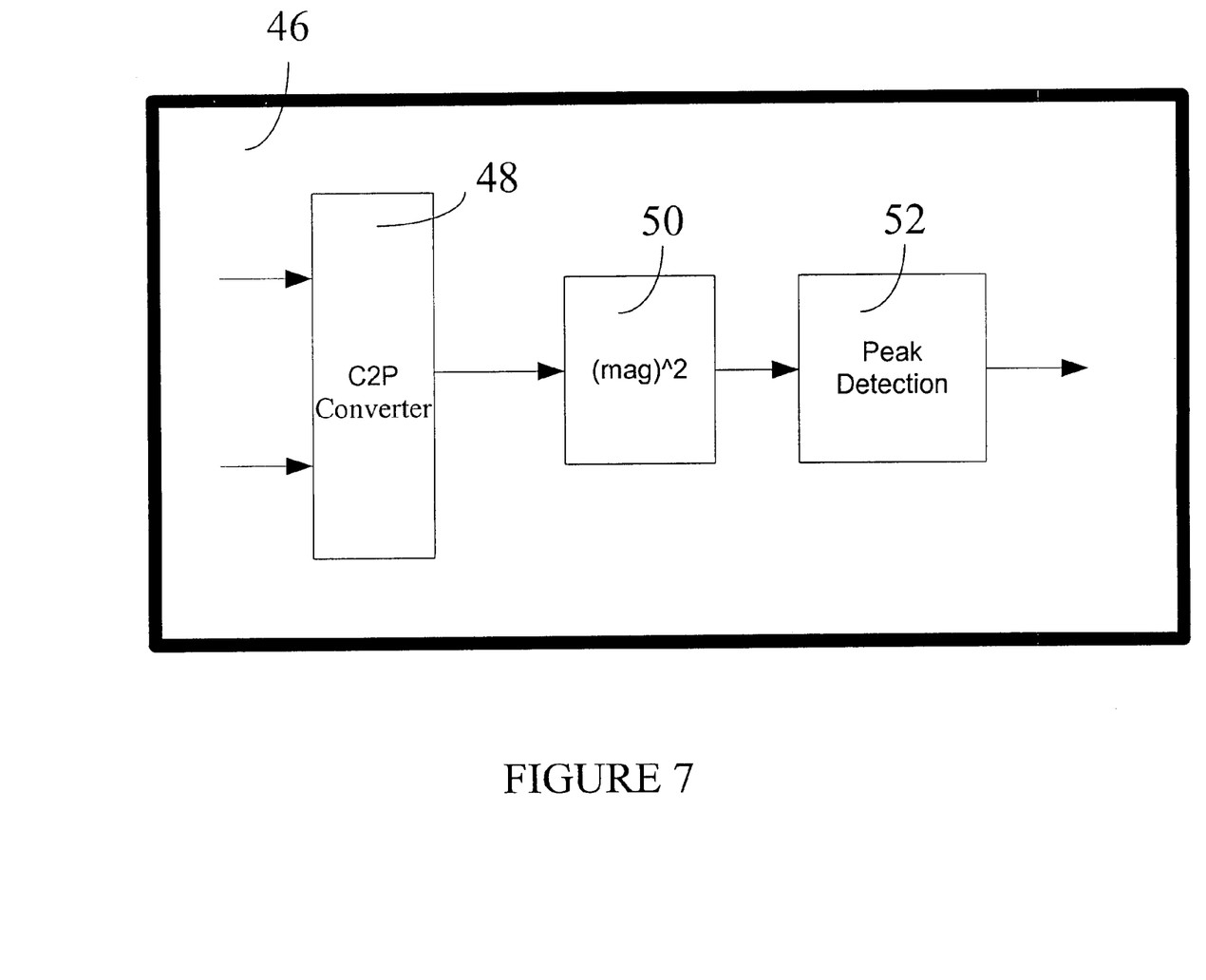
FIG. 7 is a block diagram of the detector contained in the acquisition block of FIG. 5.

Following the M-ary PSK mapper 42 is a complex correlator 44 which compares the output of the M-ary PSK mapper 42 to a stored replica of a correct (i.e. noiseless) reference signal. The detector 46, more fully depicted in FIG. 7 is used to convert the output of the complex correlator 44 to a magnitude and detect a peak. If the peak is above a predefined threshold, then packet detection is declared. Detector 46 comprises a complex to polar (C2P) converter 48, which converts each value received from complex correlator 44 into an amplitude and phase value. The magnitude output of C2P 48 is fed to an optional magnitude calculation module 50 which calculates a signal power according to the formula $(mag)^2$. Calculation of the squared magnitude is not absolutely necessary, for example, the magnitude could be used in some applications. The output of module 50 is then fed to peak detection module 52 which determines whether or not the correlator peak magnitude exceeds some minimum predefined threshold. If this minimum threshold is exceeded, then it indicates that the correct "signature" was received and that information bits are present. Fast peak detection techniques are available such as peak signal envelope detection and these are known to those in the art and meant to be included within the scope of the invention.

As will be understood by those skilled in the art, the present invention relates to integrated circuits in which a packet detection circuit is used in combination with other components to perform a useful function within an integrated circuit. The individual electronic and processing functions utilized in the foregoing described embodiment are, individually, well understood by those skilled in the art. It is to be understood by the reader that a variety of other implementations may be devised by skilled persons for substitution and the claimed invention herein is intended to encompass all such alternative implementations, substitutions and equivalents. Persons skilled in the field of radio frequency and integrated circuit design will be readily able to apply the present invention to an appropriate implementation for a given application.

Consequently, it is to be understood that the particular embodiments shown and described herein by way of illustration are not intended to limit the scope of the invention claimed by the inventors/assignee, which is defined by the appended claims.

We claim:

1. In a digital wireless receiver, a method of detecting the presence of a data packet in a received radio frequency (RF) signal, the method comprising:
   down-converting the received RF signal into in-phase (I) and quadrature (Q) baseband signals;
   removing direct current (DC) offsets from the I and Q baseband signals;
   modulating the I and Q baseband signals;
   mapping the modulated I and Q baseband signals to a unit circle on a QPSK constellation;
   comparing the mapped I and Q baseband signals to a reference signal via a complex correlator;
   detecting a peak of a complex correlator output; and
   in response to the peak being above a predefined threshold, indicating that a data packet has been received.

2. The method of claim 1, wherein said detecting comprises:
   converting the complex correlator output from a complex value to a polar value;
   calculating a signal magnitude of the polar value; and
   determining whether a data packet containing information bits is present.

3. The method of claim 2, wherein said calculating is performed using $(mag)^2$.

4. The method of claim 3, wherein said determining comprises employing a peak signal envelope detection technique.

5. The method of claim 3, wherein said determining comprises:
   comparing the signal magnitude to a minimum threshold; and
   indicating that a correct signature was received in response to the signal magnitude exceeding the minimum threshold.

6. In a digital wireless receiver, a circuit for detecting the presence of a data packet in a received radio frequency (RF) signal, the circuit comprising:
   a direct current (DC) offset module to correct for local oscillator (LO) leakage in in-phase (I) and quadrature (Q) baseband signals derived from the received RF signal; and
   an acquisition module communicating with the DC offset module, wherein the acquisition module comprises:
      a M-ary phase shift keying (PSK) mapper to map the corrected I and Q baseband signals to a quantized QPSK signal constellation;
      a complex correlator to receive input from the M-ary PSK mapper and to compare the mapped I and Q baseband signals to a reference; and
      a detector to receive input from the complex correlator and to determine the presence of a correct signature.

7. The circuit of claim 6, wherein the detector comprises:
   a complex to polar (C2P) converter to convert an output of the complex correlator into an amplitude and phase value;
   a magnitude calculation module to determine a signal size of the converted output; and
   a peak detection module communicating with the magnitude calculation module to determine presence of information bits.

8. The circuit of claim 7, wherein the received RF signal comprises a quadrature amplitude modulated (QAM) signal.

9. A method for detecting presence of a data packet in a received quadrature amplitude modulated (QAM) radio frequency (RF) signal, the method comprising:
   mapping the received QAM RF signal to a quantized phase shift keying (PSK) constellation by:
      removing direct current (DC) offsets from I and Q baseband signals derived from the received QAM RF signal; to form corrected I and Q baseband signals; and
      mapping the corrected I and Q baseband signals to a unit circle on a QPSK constellation; and
   processing in a matched complex correlator to detect the presence of a data packet by:
      comparing an amplitude normalized I and Q baseband signals to a reference signal via a complex correlator;
      detecting a peak of a complex correlator output; and
      if the peak is above a predefined threshold, indicating that a data packet has been received.

10. The method of claim 9, wherein said detecting comprises:
    converting the complex correlator output from a complex value to a polar value;
    calculating a signal magnitude of the polar value; and
    determining whether a data packet containing information bits is present.

11. The method of claim 10, wherein said determining comprises:
    comparing the signal magnitude to a minimum threshold; and indicating that a correct signature was received in response to the signal magnitude exceeding the minimum threshold.

12. In a digital wireless receiver, a circuit for detecting presence of a data packet in a received radio frequency (RF) signal, the circuit comprising:
   a direct current (DC) offset module configured to correct for local oscillator (LO) leakage in in-phase (I) and quadrature (Q) baseband signals derived from the received RF signal;
   a M-ary phase shift keying (PSK) mapper configured to map the corrected I and Q baseband signals to a quantized QPSK signal constellation;
   a complex correlator configured to compare the mapped I and Q baseband signals to a reference; and
   a detector configured to determine a signature associated with the data packet in response to the comparison.

13. The circuit of claim 12, wherein the detector comprises:
   a complex to polar (C2P) converter configured to convert an output of the complex correlator into an amplitude and phase value;
   a magnitude calculation module configured to determine a signal size of the converted output; and
   a peak detection module communicating with the magnitude calculation module configured to determine the presence of the signature.

14. The circuit of claim 13, wherein the received RF signal comprises a quadrature amplitude modulated (QAM) signal.

15. A quadrature amplitude modulated (QAM) receiver, comprising:
   a direct current (DC) offset module to correct for local oscillator (LO) leakage in in-phase (I) and quadrature (Q) baseband signals derived from a received radio frequency (RF) signal;
   an acquisition module communicating with the DC offset module, wherein the acquisition module comprises:
      a M-ary phase shift keying (PSK) mapper to map the corrected I and Q baseband signals to a quantized QPSK signal constellation;
      a complex correlator to receive input from the M-ary PSK mapper and to compare the mapped I and Q baseband signals to a reference; and
      a detector to receive input from the complex correlator and to determine presence of a correct signature.

16. The QAM receiver of claim 15, wherein the detector comprises:
   a complex to polar (C2P) converter to convert an output of the complex correlator into an amplitude and phase value;
   a magnitude calculation module to determine a signal size of the converted output; and
   a peak detection module communicating with the magnitude calculation module to determine presence of information bits.

17. A quadrature amplitude modulated (QAM) receiver, comprising:
   a direct current (DC) offset module configured to correct for local oscillator (LO) leakage in in-phase (I) and quadrature (Q) baseband signals derived from a received radio frequency (RF) signal;
   a M-ary phase shift keying (PSK) mapper configured to map the I and Q baseband signals to a quantized QPSK signal constellation;
   a complex correlator configured to compare the mapped I and Q baseband signals to a reference; and
   a detector configured to determine a signature associated with a data packet in response to at least one of the M-ary PSK mapper or the complex correlator or a combination thereof.

18. The QAM receiver of claim 17, wherein the detector comprises:
   a complex to polar (C2P) converter configured to convert an output of the complex correlator into an amplitude and phase value;
   a magnitude calculation module configured to determine a signal size of the converted output; and
   a peak detection module communicating with the magnitude calculation module configured to determine the signature.

* * * * *

UNITED STATES PATENT AND TRADEMARK OFFICE
CERTIFICATE OF CORRECTION

Page 1 of 1

PATENT NO.         : 7,567,631 B2
APPLICATION NO.    : 10/661943
DATED              : July 28, 2009
INVENTOR(S)        : Neil Birkett It is certified that error appears in the above-identified patent and that said Letters Patent is hereby corrected as shown below:

At column 5, line 50, Claim 1, after "offsets from the I and Q baseband signals" insert -- to form corrected I and Q baseband signals; --.

At column 5, line 51, Claim 1, delete "modulating the I and Q baseband signals;".

At column 5, line 52, Claim 1, replace "modulated" with -- corrected --.

At column 6, line 27, Claim 6, after "determine" delete "the".

At column 6, line 46, Claim 9, after "signal" delete ";".

At column 7, line 27, Claim 13, after "determine" delete "the".

At column 8, line 23, Claim 17, after "the" insert -- corrected --.

Signed and Sealed this
Third Day of May, 2011

David J. Kappos
*Director of the United States Patent and Trademark Office*